United States Patent [19]
Alcudia et al.

[11] Patent Number: 5,121,270
[45] Date of Patent: Jun. 9, 1992

[54] MULTITRANSDUCER HEAD POSITIONING SERVO FOR USE IN A BI-DIRECTIONAL MAGNETIC TAPE SYSTEM

[76] Inventors: Ezra R. Alcudia, 7402 Canyon Breeze Dr., San Diego, Calif. 92126; Robert E. Whyte, Jr., 301 Oakbranch Dr., Encinitas, Calif. 92024

[21] Appl. No.: 409,542

[22] Filed: Sep. 19, 1989

[51] Int. Cl.⁵ .................... G11B 5/58; G11B 5/78
[52] U.S. Cl. .................... 360/77.01; 360/49; 360/77.12; 360/134
[58] Field of Search .......... 360/48, 49, 53, 72.2, 360/73.09, 74.4, 77.01, 77.08, 77.12–77.15, 78.02, 78.14, 131, 136, 132, 133, 134, 135

[56] References Cited

U.S. PATENT DOCUMENTS

| | | | |
|---|---|---|---|
| 4,048,660 | 9/1977 | Dennison et al. | 360/77.08 |
| 4,409,628 | 10/1983 | Frimet et al. | 360/73.09 |
| 4,472,750 | 9/1984 | Klumpp et al. | 360/78.02 |
| 4,977,472 | 12/1990 | Volz et al. | 360/77.05 |

OTHER PUBLICATIONS

IBM Technical Disclosure Bulletin, vol. 25, No. 2, "Re-Recordable Servo System for Multi-Track Tape", Schwartz, Jul. 1982, pp. 778–779.

Primary Examiner—Aristotelis Psitos
Assistant Examiner—Steven R. Garland

[57] ABSTRACT

In a multichannel recording/playback apparatus, a bi-directional transport longitudinally moves a magnetic tape past a multitransducer magnetic head for recording and/or playback. The magnetic head is positionable to selected tracks in a stepwise manner across the width of the tape. A head positioning servo utilizes binary patterns pre-recorded on the tape, consisting of magnetized blocks and non magnetized blocks which are read by a servo transducer integral with the multitransducer head stack. For each centerline corresponding to a specified track location, the servo tranducer straddles the line between adjacent, longitudinally recorded patterns and when the servo transducer is "on track" two conditions are met: 1) the played back code is the track address included in the track location identifier stored in a controlling microcontroller, 2) the amplitudes of the "1 bits" of the played back code are all the same and equal to ½ the amplitude of a full track width output. When "on track", the servo transducer straddles the line between adjacent lines of magnetized blocks and non magnetized blocks, and therefore plays back ½ amplitude signals from the magnetized blocks on one side of the "on track" line and ½ amplitude signal from the magnetized blocks on the other side of the "on track" line.

9 Claims, 7 Drawing Sheets

MULTITRANSDUCER HEAD POSITIONING SERVO FOR USE IN A BI-DIRECTIONAL MAGNETIC TAPE SYSTEM

BACKGROUND OF THE INVENTION

1. Field of the Invention

This invention relates to positioning a multitransducer magnetic head over a selected track of a magnetic tape in a magnetic tape system, and in particular to accurately maintaining the selected head position.

2. Description Relative to the Prior Art

The invention, as well as the prior art, will be described with respect to the figures, of which:

It is known in the magnetic recording art that when reading a previously recorded signal by means of a playback head, the magnitude of the playback signal is proportional to the amount of flux intercepted by the playback head. Generally, the signals have been recorded on a magnetic medium either as linear tracks or circular tracks, and accordingly maximum signal is obtained when the playback head is directly centered over, and accurately follows, the recorded track. Similarly, when recording is effected by a positionable record head, the record head position must be so controlled relative to the medium that a compatible playback head may later be exactly centered over the recorded track.

Figure 1:
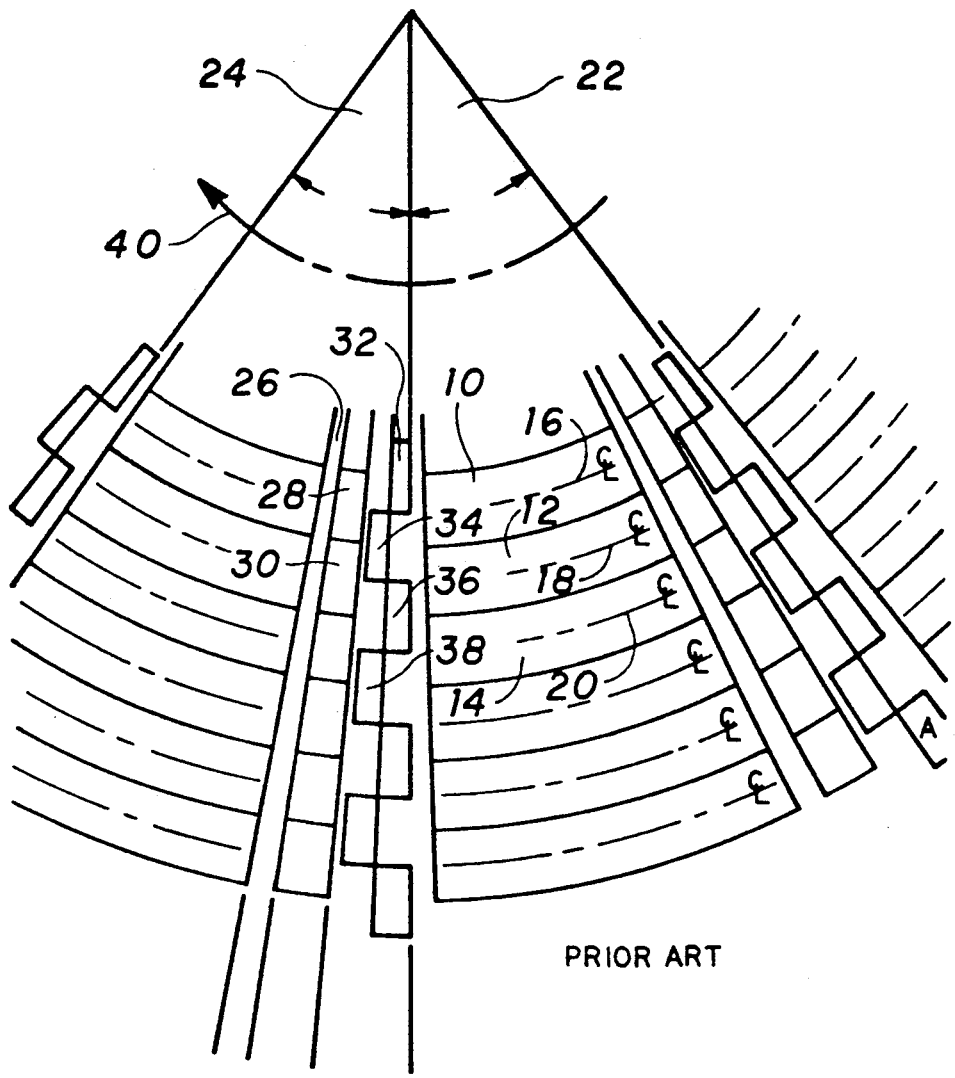
FIG. 1 is a schematic representation of the servo pattern of a magnetic disk known in the prior art.

In the prior art the problem of head positioning and tracking has generally arisen in the context of digital disk recording, wherein the data is recorded on concentric circular tracks, and, at any given time, a single track head is positioned to perform recording or playback on a selected track. Referring to FIG. 1, the disk track arrangement of a typical flexible 5.25" disk, high density system (see, for example, "The Complete Handbook of Magnetic Recording", 3rd Edition, Finn Jorgensen, Tab Books, Blue Ridge Summit, Pa., pages 389-390) comprises typical tracks 10, 12, 14 having centerlines 16, 18, 20 and very narrow guard bands separating the tracks. In positioning the disk head over a selected track, the head is first positioned to the nominal location of the track by open loop means, and then locked into direct coincidence with a track by means of a servomechanism. The servo operation utilizes a format prerecorded on the disk which is read by the head as it seeks coincidence with the selected track. For fine positioning of the head by means of the servo, the disk is divided into sectors, e.g. 22, 24, and the tracks of each sector are provided with a pre-recorded block of information. A gap marker 26 occurs first, followed by a track identifier/sector address e.g. 28, 30, which precedes the servo block, for example, 32, 34 or 36, 38. It will be noted that the servo block 32 overlays the inner portion of the track 10 and covers exactly one half of the track 10. The block 34 has been pre-recorded on the other side of the centerline 16 and slightly upstream of the block 32, and the servo block 34 exactly covers the remaining outer half of track 10 as well as extending to the adjacent track 12 where it covers track 12 up to its centerline 18. The servo block 32 is comprised of one unique recorded frequency, and its companion servo block 34 is comprised of a different unique frequency. For the direction of disk rotation shown 40, if the read head is centered directly over the centerline 16 of the track 10 the head will read a signal having the frequency characteristic of the block 34 followed by an equal amplitude signal having a frequency derived from the block 32. If the head is off center, the amplitude of one read servo block will exceed that of the other, and the relative amplitudes of the differing frequency signals of the two companion servo blocks will be indicative of the magnitude and direction of offset. The read servo signals, readily identified in each sector because of the times of their occurrence and their unique frequencies, are fed to a closed loop head positioning servo which drives the head actuator in such a direction as to equally match the read amplitudes of the servo blocks and thereby to center the head over the track, which also contains the recorded data. While the above described system identifies the blocks relative to the track centerline by use of different frequencies, other techniques in the art include block identification by means of sequences of pulses within the blocks, e.g. U.S. Pat. No. 4,775,902, blocks of superimposed opposite Phases, e.g. Jorgensen supra, page 392, or blocks of sequential odd or even signals, e.g. U.S. Pat. No. 4,202,019.

In the prior art, multichannel positionable heads have generally not been employed in linear magnetic tape transports where the practice has been the use of multichannel fixed heads. Unlike disks, the tape widths for data recorders have typically been less than 1 inch wide, and it has been more convenient and economical to fabricate multichannel heads than to provide for servoing a single track head across the width of the tape. With the advent of thin film deposited heads, however, very narrow track widths become feasible, i.e. ranging from 0.005" down to 0.0015" wide, opening the possibility of extremely high track densities. For example, a ¼" inch wide tape can support on the order of 45 0.005" recorded tracks. To fabricate a full 45 track head in a ¼" envelope would give rise to severe interconnect problems, particularly in a read after write configuration, (where some 180 head interconnect wires would be needed) as well as increased susceptibility to head manufacturing yield problems. Resultantly, the use of a servo controlled multichannel head having a lesser number of narrow tracks which is incrementally stepped across the tape allows recording the full complement of channels on the tape. Such a recording configuration provides increased storage capacity, and is also commensurate with reasonable head construction techniques capable of providing acceptable head yields.

SUMMARY OF THE INVENTION

In a multichannel recording/playback apparatus, a bi-directional transport longitudinally moves a magnetic tape past a multitransducer magnetic head for recording and/or playback. The magnetic head is positionable to selected tracks in a stepwise manner across the width of the tape. A head positioning servo utilizing binary patterns Pre-recorded on the tape consists of magnetized blocks and non magnetized blocks, which are read by a servo transducer integral with the multitransducer head stack. The full length of tape is transported from one end of the tape to the other, and the head is stepped and servoed to a new position for each reversal of tape direction to provide access to the entire recording surface. This mode of operation is referred to as "serpentine" recording.

Figure 2:
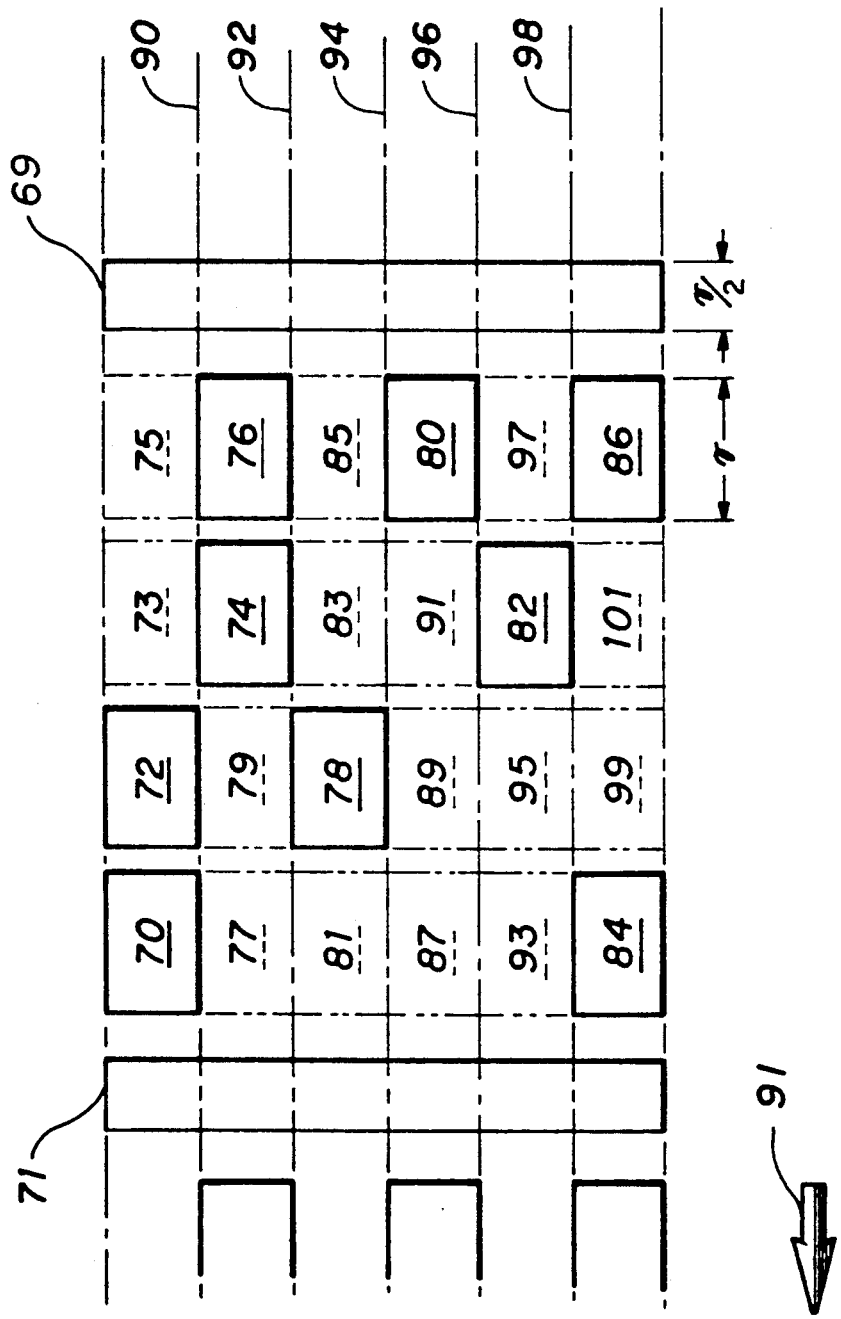
FIG. 2 is a schematic representation of the servo pattern of a magnetic tape according to the present invention.

Referring to FIG. 2. the pre-recorded servo information comprises magnetized block (even reference numbers 70-86) and non magnetized block (odd reference numbers 73-101) patterns, defining binary patterns wherein the magnetized blocks are played back as "1" bits of the code and the non magnetized blocks are played back as "0" bits. A unique pre-determined binary code is thereby read by the servo transducer when it is "on track", equally straddling two adjacent patterns for a specified head location. The centerline 90, for example, is followed by the servo transducer when it is "on track" for the coded track specified by the magnetized blocks 70, 72 and non magnetized blocks 73, 75. For tape moving in the direction of the arrow 91, the code being read along the centerline 92 is 0111; this particular centerline being characterized by having a non magnetized block 77 in the highest order bit position followed by three magnetized blocks, 78, 74, 76. For each centerline corresponding to a specified track location, the servo transducer straddles the line between adjacent, longitudinally recorded patterns and when the servo transducer is "on track" two conditions are met: 1) the played back code is the track address included in the track location identifier stored in a controlling microcontroller, 2) the amplitudes of the "1 bits" of the played back code are all the same and equal to $\frac{1}{2}$ the amplitude of a full track width output. When "on track", the servo transducer straddles the line between adjacent lines of magnetized blocks and non magnetized blocks, and therefore plays back $\frac{1}{2}$ amplitude signal from the magnetized blocks on one side of the "on track" line and $\frac{1}{2}$ amplitude signal from the magnetized blocks on the other side of the "on track" line.

If the servo transducer is off slightly to one side of the "on track" line, it plays back the correct track address code identifying the location of the magnetic transducer, but it intercepts more signal from the "bits" recorded on that side of the line than it intercepts from the "bits" recorded on the other side of the line. This indicates "off track" positioning of the head, and after detection of this difference in amplitudes, the servo steps the head in the direction of the "on track" line whereby the difference in outputs is driven towards zero. If the servo transducer is far enough off the desired track location to read an address code different from that of the desired head location, the control microcontroller compares the address code being read and the desired address code, and from stored information identifying track position in terms of the track address patterns pre recorded on the tape calculates the required correction and then moves the head in the direction to intercept the desired track.

The servo block segments are repetitively recorded for the full length of the tape, and are both preceded and followed by a trigger marker 71, 69 which extends across the same width of the tape as that occupied by the servo blocks themselves. No matter the location of the servo transducer relative to the servo blocks, the transducer intercepts a full track's worth of signal, i.e. a full amplitude signal, on crossing a trigger marker when entering a servo block segment. The trigger marker duration is differentiable from the duration of the servo blocks Proper, and, for example, may be one half the duration of a servo block. This difference in duration, i.e. pulse width, is detected and used to identify the trigger marker as the beginning of a servo segment.

Magnetic tapes are subject to dropouts which cause signal attenuation or loss, and a dropout on a tape servo track will seriously perturb head positioning. To insure "dropout insensitive" servo data, the played back amplitudes of two "1 bit" magnetized blocks signals, one from each side of the "on track" line are summed for each servo sample. The magnitude of this sum is compared to the magnitude of a full amplitude signal which is a known system parameter for the playback channel. If there is a dropout during a servo block Playback, this comparison of nominal full amplitude and the "1 bit" sum fails, and no head positioning is performed until the servo information is again validated by successfully meeting the test.

The servo block coding is inherently compatible with serpentine operation of the magnetic tape system as the servo block pattern and gap markers may be read in either direction and the resultant read binary address pattern correlated with the direction of tape travel to determine track identification by means of stored information in the microcontroller memory.

DESCRIPTION OF THE INVENTION

Figure 3:
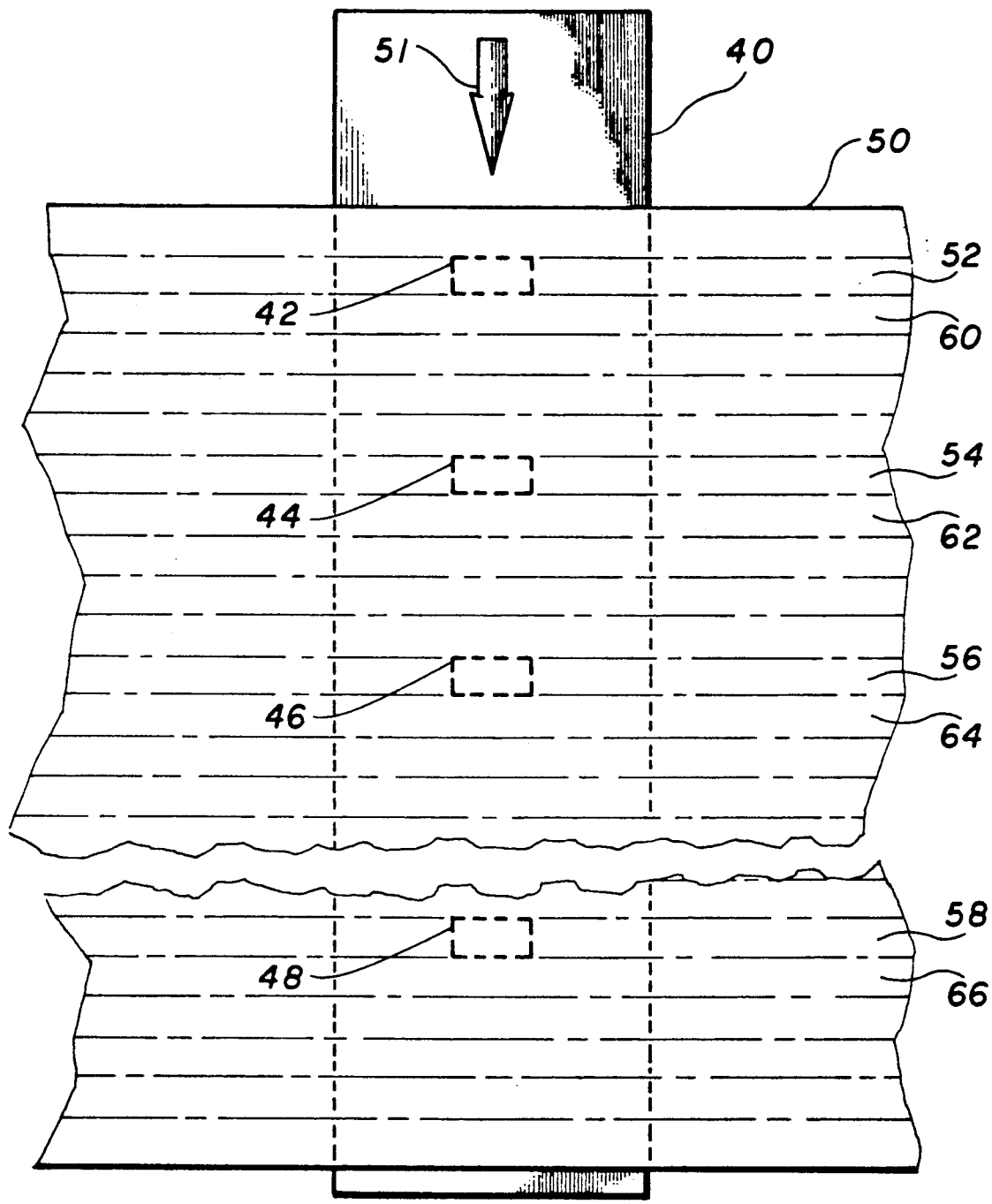
FIG. 3 is a drawing representing the track arrangement of a multitransducer magnetic head and an associated magnetic, tape, useful in understanding the present invention.

In a preferred embodiment, the servo of the invention is employed in a linear tape system having a multitransducer magnetic head whose track pitch is uniform, and wherein the head's transducers are spaced apart in the head stack at distances which are essentially multiples of the transducer trackwidth. By appropriate selection of pitch and transducer track width, the multitransducer head may then be incrementally positioned across the width of the tape by means of a stepping motor so that the entire recording surface of the tape is utilized. Referring to FIG. 3, a head structure 40 having eight data transducers e.g. 42, 44, 46, 48, whose individual track widths, are 0.005" on a pitch of 0.025" allows stepping the head to cover $8 \times 0.025" = 0.200"$ of the surface of a $\frac{1}{4}"$ tape with data. With the head 40 positioned relative to $\frac{1}{4}"$ wide tape 50 as shown in FIG. 3, recording occurs on tape tracks, e.g. 52, 54, 56, 58. Under control of the head positioning servo, each incremental step of the head positioning motor moves the head 40 approximately 155 microinches; therefore to step the head from one set of 0.005" tape tracks to the next requires 32 steps. After the head 40 has been stepped 32 steps in the direction of the arrow 51, track 60 is positioned under transducer 42, track 62 under transducer 44, track 64 under transducer 46, etc. It will be appreciated that in bi-directional, serpentine tape transportation, five head positions provide complete access for recording or playback over substantially the entire usable tape surface.

Figure 4:
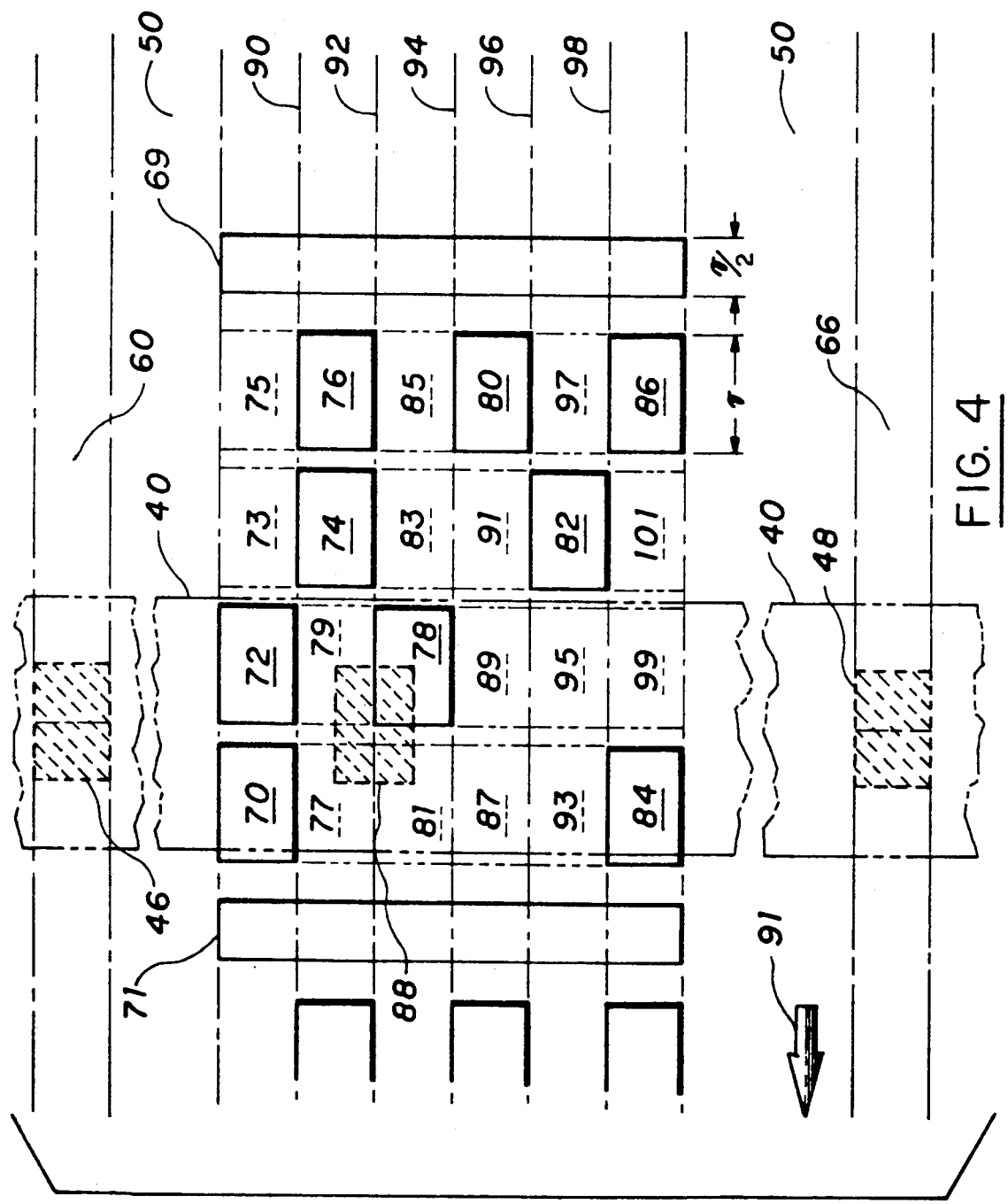
FIG. 4 is a drawing of the head of FIG. 3 superimposed on a magnetic tape containing the servo pattern of FIG. 2.

As previously described, the pre-recorded servo segments comprise binary patterns along dedicated tracks that are used solely for track address and servo positioning; no data is present on the servo block pattern tape tracks which are recorded in the center section of the tape. A separate servo transducer in the head stack, i.e. a ninth transducer in the above example, is reserved for playback of the pre-recorded servo segments, and is widthwise located in the middle of the head stack. Referring to FIG. 4, all the magnetized blocks (even reference numbers) in the blocks 70-101, as well as the trigger markers 71 and 69, are recorded at the same frequency (500 khz), and with the same amplitudes. The magnetized blocks are twice as long as the trigger markers 71, 69. Because these signals are single frequency, no frequency equalization is required in the servo playback channel. This not only simplifies the implementation of the servo playback channel, but it is particularly advantageous in determining the "on track" condition by amplitude comparison as there is no amplitude distortion error due to non uniformity of frequency equalization.

As previously stated, the trigger marker blocks 71, 69 are of half the time duration of the servo magnetized blocks. As seen in FIG. 4, a portion of the head stack 40 of FIG. 3, shown in phantom, and containing a servo transducer 88 and typical data transducers 46 and 48, is in contact with the tape 50. For the present, tape motion is assumed in the direction of arrow 91, and the servo transducer 88 is shown centered on the centerline 92 partially in contact with, and straddling, the magnetized block 78. It will be appreciated that when the servo transducer 88 is centered on the centerline 92, as shown, and as the tape moves in the direction of arrow 91, the playback signals from the non magnetized block 77 and the magnetized blocks 78, 74, 76 lying on the line 92 will be sequentially concatenated as the transducer 88 traverses the blocks. The playback signal from the magnetized block 78 will be identical in magnitude with the signals from the magnetized blocks 74 and 76, i.e. ½ of full track signal amplitude. This is the condition for zero tracking error; the servo transducer 88 is centered on the centerline 92 of the track, and at that time all the data transducers are centered over tape data tracks, e.g. the data transducer 46 is centered on data track 60 and data transducer 48 is centered over data track 66.

To understand the means for identifying the location of the positioned head 40, consider the time when the servo transducer 88 just contacts the trigger marker 71. As the tape continues to move to the left as shown, the trigger marker 71 is read, initiating a servo sample. Timed strobe pulses test the presence or absence of magnetized block signals in the played back servo pattern. There is no signal Played back by servo transducer 88 on either side of centerline 92 at the time of the playback of the first possible block position 77, 81 and the servo system assigns a "0" to the high order bit position of the binary track address code. In traversing the magnetized block 78 a half amplitude signal is read and a "1" is allocated to the next highest bit position, while magnetized blocks 74 and 76 sequentially give rise to half amplitude signals assigning "1"s in the third and fourth bit positions, for a resultant played back code of 0111. If the amplitudes of the playback signals from the magnetized blocks 78, 74 and 76 are half amplitudes, meaning that servo transducer is centered over line 92, and if the sum of the amplitudes of the played back signals from the blocks 78 and 74 equals the channel full scale amplitude value, meaning there is no dropout in the recorded servo segment, then the readings within the segment are validated and represent "on track" operation.

For the block patterns of FIG. 2 and FIG. 4, the binary played back signals when the servo transducer is "on track" for each of the lines 90-98 are:

| "On Track" # | ½ Amplitude Block Pattern | | | | Binary Value |
|---|---|---|---|---|---|
| 90 | (70) | (72) | (74) | (76) | F or F |
| 92 | (77) | (78) | (74) | (76) | 7 or E |
| 94 | (81) | (78) | (83) | (80) | 5 or A |
| 96 | (87) | (89) | (82) | (80) | 3 or C |
| 98 | (84) | (99) | (82) | (86) | B or D |

It will be appreciated that the magnetized block and non magnetized block patterns not only provide the head servoing information but also provide the address of the tape track. In the column of "Binary Value" above, the first entry is the coding which specifies the track address for tape motion in the direction of the arrow 91, and the second entry specifies track address for tape motion in the opposite direction.

Recalling that there are 32 steps of approximately 155 microinches each required to move from one data track to the next, the situation where the multitransducer head is to be stepped to a new position is now considered. Assuming the tape is moving in the direction of the arrow 91, and the servo transducer 88 is positioned straddling the centerline 90 characterized by the binary pattern of 1111 (binary F), and end of tape is reached. For serpentine operation, the tape transport is given a command to reverse direction, and the head stack 40 is programmed to step towards the centerline 92, whose address pattern read in the direction opposite to the arrow 91, is 1110 (binary E). As the tape is decelerated, the microprocessor switches off the servoing action, and the microprocessor, having information of the head stack 40 present position and the address of the required new position, outputs pulses to the stepping motor in an open loop manner sufficient to move the head stack 40 to the new location. When the head is at the new position, and the tape is up to speed in the reverse direction, the servo is again energized, and with the servo transducer approximately over the new tracking centerline 92, the servo operates to attain the final positioning of the head stack as previously described.

Figure 5:
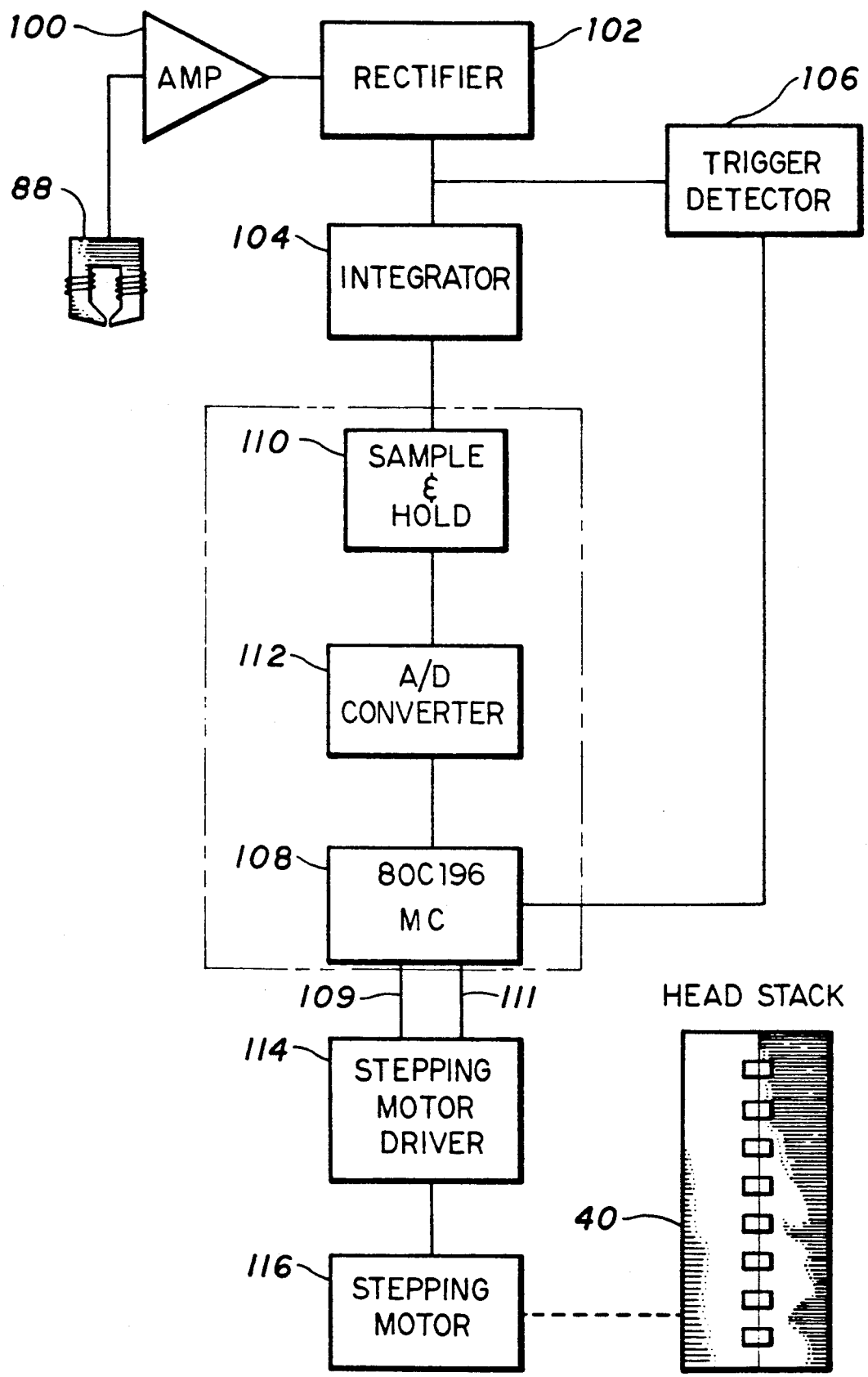
FIG. 5 is a block diagram of the multitransducer head positioning servo of the present invention.

Referring to the head servo block diagram, FIG. 5, during servo signal playback the servo transducer 88 feeds a reproduce amplifier 100 whose output is the amplified block and trigger marker played back signals. The amplified output signal is converted to a unidirectional signal by a rectifier 102 whose output is connected to an integrator 104 and a trigger detector 106. Recalling that the trigger marker is half the duration of a servo block, the trigger detector 106 is a pulse width detector whose output indicates to a microcontroller 108 whether the signal is a trigger marker or a servo block. The microcontroller 108 is a Type 80C196KB 16 Bit High Performance CHMOS Microcontroller manufactured by Intel Corporation of Santa Clara, Ca. The microcontroller 108 provides all the timing, control and decision functions in the operation of the servo system, along with other transport and system control functions. Integral with the microcontroller 108 is a sample and hold circuit 110 whose output feeds an analog to digital converter (A/D) 112 which is also par of the microcontroller 108 package, all shown within the dotted rectangle of FIG. 5. Under control of a timer which is part of the microcontroller 108, the held values in the sample and hold circuit 100 are digitized by the A/D converter 112 and the digital values are utilized to determine the amplitudes of the played back binary patterns for positioning the heads as previously described. Depending on the comparison results of the signal amplitudes from the blocks on either side of the "on track" line, a pulse is transmitted from the microcontroller 108 to a stepping motor driver 114 via line 109 or 111 depending upon direction of the required step. The driver 114 energizes a stepper motor 116 mechanically coupled to the head stack 40, causing the head to move towards the relevant "on track" line.

Figure 6A:
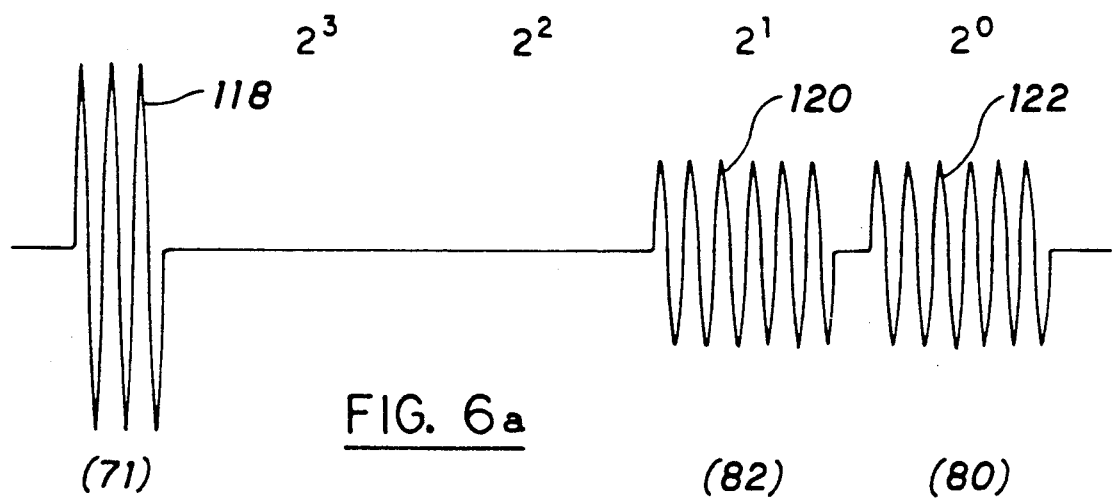
FIGS. 6a-6c are waveforms illustrating "on track" operation of the servo of the present invention.
Figure 6B:
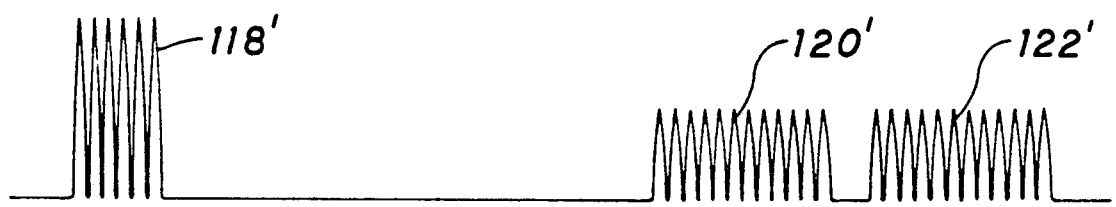
Figure 6C:
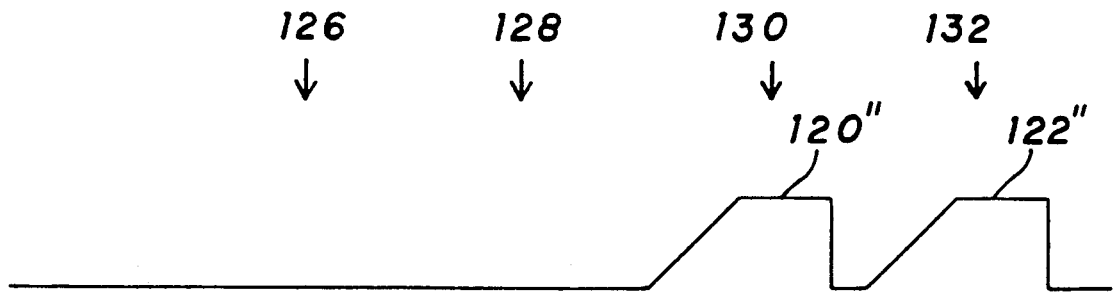

Referring to FIG. 6a, it is assumed that the servo transducer is "on track" for the centerline 96 of FIG. 4 with the tape moving in the direction of the arrow 91. The sequence of signals played back will first consist of the trigger marker (71) playback signal 118 followed by two periods of no signal (blocks 87, 89) corresponding to two binary "0" and then the "1" bit binary (blocks 82, 80) playback signals 120, 122; one from each side of the centerline 96, at half amplitude. This sequence continually repeats as the recorded servo data is read by the servo head 88, and, in the preferred embodiment, occurs at a 2000 Hz repetition rate. The signals of FIG. 6a are full wave rectified by the rectifier 102, (FIG. 6b), the full amplitude, narrower trigger signal 118' is detected and passed to the microcontroller 108 to initiate integration and strobe timing routines. The rectified block signals, 120' 122' are applied to the integrator 104 resulting in the waveforms of FIG. 6c. (In the drawings, different, but related elements are identified with the same reference character, albeit they are distinguished from each other by means of primes.) The integration time is set by the microcontroller 108 which outputs strobes 126-132 at the time intervals corresponding to the possible block occurrences. At each of the strobe times the value of the integrated output is held in the sample and hold circuit 110 and then digitized by the A/D converter 112. It will be noted in FIG. 6c that the strobes 126 and 128 result in zero output values, while strobes 130, 132 result in half amplitude values, 120", 122'. Each sample value is digitally stored in the microcontroller 108 for further processing.

The dropout validation check is then performed: the digital values of the amplitudes of two of the block signals, one from each side of the straddled centerline 96 (in this case, the signals from blocks 82 and 80) are summed and the result compared to the channel full amplitude value. If the resultant sum is equal to the nominal value of the channel full amplitude signal, the dropout check is satisfied and the data will be further processed. The digital values of the binary block signals, i.e. 82, 80, are then compared. For the assumed condition of "on track" operation, the amplitudes are equal, and, therefore, no signal is output by the microprocessor to step the head.

Figure 7A:
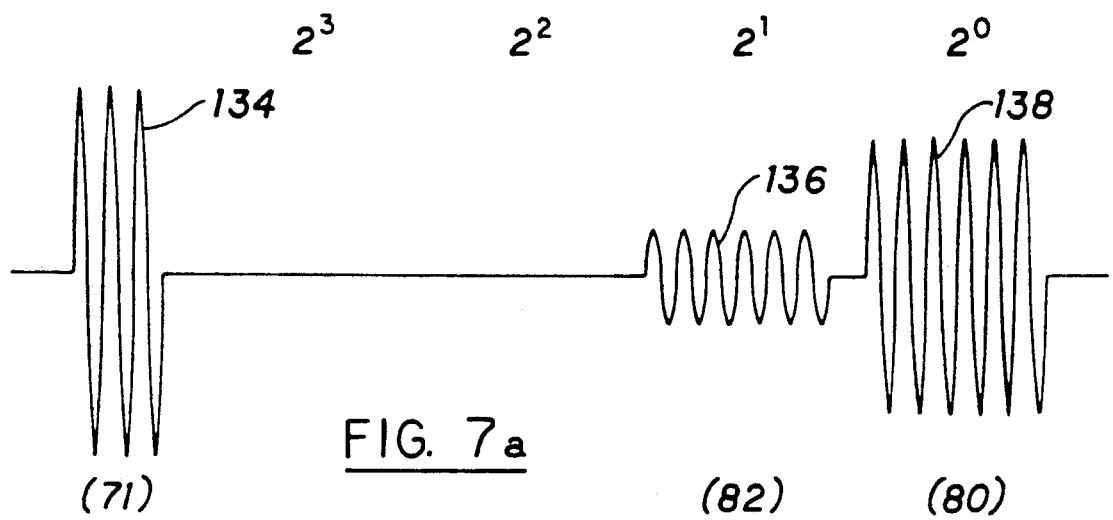
FIGS. 7a-7c are waveforms illustrating "off track" operation of the servo of the present invention.
Figure 7B:
Figure 7C:
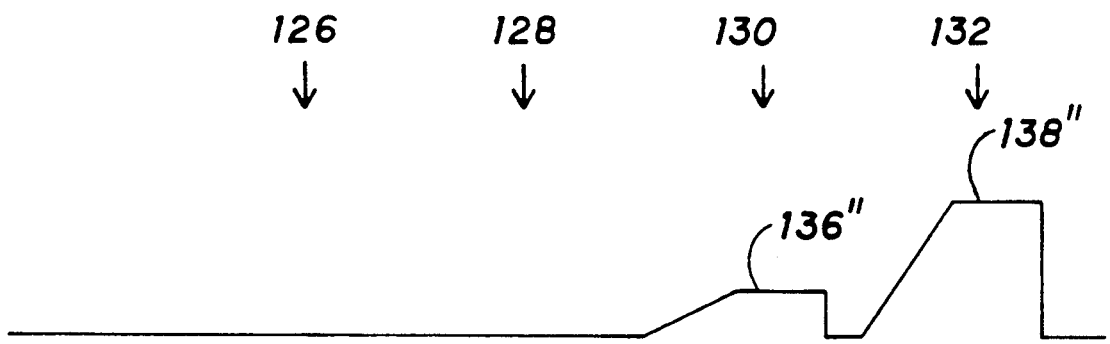

Referring to FIG. 7a for an "off track" condition, while the servo is driving the head towards the track line 96 but while the head stack 40 is displaced in the direction of block 80, the played back block pulses 136, 138 have differing amplitudes. FIGS. 7b and 7c correspond to the conditions explained above for FIG. 6b and 6c. For the "off track" condition, the block 138 is larger in amplitude than the block 136, and resultantly the sampled and held value 138" is greater than that of 136". The sum of the digitized values of 136" and 138" is equal to that of the channel full scale amplitude, validating the dropout check. The result of the comparison by the microcontroller 108 of the two amplitude values is the feeding of a pulse on the appropriate line, say, 109 (FIG. 5) to step the head stack 40 so that the magnetized block played back amplitudes 136', 138' are urged towards equality. During the next reading of servo information from the tape (500 microseconds later at the 2000 Hz servo rate), another pulse is generated, if required, and the process continues until the servo transducer is reading equal amplitude signals from the straddled servo blocks.

It will be appreciated that the block configuration pattern of FIG. 2 may be varied to meet specific system requirements. For example, more than five head stack positions across the tape would require a more elaborate pattern. Any pattern of servo blocks, however, must meet the following criteria: 1) there must be at least one magnetized block in each linear array pre-recorded on the tape, 2) all blocks must be of the same frequency, and 3) no magnetized block in a first linear array of blocks may be contiguous, in the widthwise direction, to a magnetized block of an adjacent, second linear array. Note, for example, in FIG. 2 that block 82 has no contiguous blocks on either side of it in a widthwise direction.

The teachings of the invention may be applied to tape for use with a reel to reel bi-directional transport, or the servo patterned tape may be enclosed in a cartridge for use with a cartridge loaded bi-directional transport.

The invention has been described in detail with particular reference to preferred embodiments thereof, but it will be understood that variations and modifications can be effected within the spirit and scope of the invention.

What is claimed is:

1. A magnetic tape adapted for use in a bi-directional tape transport, said tape having thereon a multiplicity of single frequency recorded signal patterns oriented along said tape, said patterns comprising a plurality of longitudinal linear arrays of magnetized blocks and co-linear non magnetized blocks, said plurality of longitudinal linear arrays being transversely contiguous, wherein said magnetized blocks and said non magnetized blocks of each of said longitudinal linear arrays comprise the bits of a plurality of binary coded segments, wherein the longitudinal common boundary line between each contiguous pair of said binary coded segments is the centerline of a servo track of said tape.

2. In a magnetic storage medium having multiple addressable record tracks, the improvement comprising:
multiple servo tracks clustered together in fixed spatial relationship with respect to the multiple record tracks, each servo track having binary code bursts arranged sequentially to form a code burst pattern that is unique to each servo track, each record track having an address corresponding to a resultant unique code burst pattern formed from the concatenation of two binary code burst patterns disposed immediately adjacent to opposite sides of a longitudinal common boundary located a predetermined distance from the record track whose address corresponds to the resultant code burst pattern.

3. A magnetic storage medium as defined in claim 2 wherein the storage medium is a magnetic tape.

4. A magnetic storage medium as defined in claim 2 wherein each unique pattern of binary code bursts is repetitive along each servo track.

5. A magnetic storage medium as defined in claim 4 wherein the repetitive code burst patterns along each servo track are separated by a predetermined triggering signal.

6. A magnetic storage medium as defined in claim 2 wherein the binary code bursts are comprised of (1) magnetized blocks, and (2) non-magnetized blocks.

7. A magnetic storage medium as defined in claim 2 wherein the servo tracks are parallel with the record tracks.

8. A magnetic storage medium as defined in claim 2 wherein immediately adjacent servo tracks are contiguous.

9. A magnetic recording/reproducing apparatus including:
- a magnetic storage medium having multiple addressable record tracks and having multiple servo tracks clustered together in fixed spatial relationship with respect to the multiple record tracks, each servo track having binary code bursts arranged sequentially to form a code burst pattern that is unique to each servo track, each record track having an address corresponding to a resultant unique code burst pattern formed from the concatenation of two binary code burst patterns disposed immediately adjacent to opposite sides of a longitudinal common boundary located a predetermined distance from the record track whose address corresponds to the resultant code burst pattern;
- a servomechanism means responsive to a tracking error signal derived from the binary code bursts immediately adjacent either side of the longitudinal common boundary; and
- a record/playback head positionable, in response to the tracking error signal, in alignment with the record track situated a predetermined distance from the longitudinal common boundary.

* * * * *